United States Patent
Mohan et al.

(10) Patent No.: US 11,148,882 B2
(45) Date of Patent: Oct. 19, 2021

(54) ROBOTIC ORDER PICKING

(71) Applicant: Target Brands, Inc., Minneapolis, MN (US)

(72) Inventors: Ashwin Mohan, Minneapolis, MN (US); Karen Boser, Minneapolis, MN (US); Debajit Ghosh, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 281 days.

(21) Appl. No.: 16/502,887

(22) Filed: Jul. 3, 2019

(65) Prior Publication Data

US 2020/0017297 A1 Jan. 16, 2020

Related U.S. Application Data

(60) Provisional application No. 62/697,623, filed on Jul. 13, 2018.

(51) Int. Cl.
*G06F 7/00* (2006.01)
*B65G 1/137* (2006.01)
*G06Q 50/28* (2012.01)
*G05D 1/00* (2006.01)

(52) U.S. Cl.
CPC ........... *B65G 1/1371* (2013.01); *G06Q 50/28* (2013.01); *G05D 1/0088* (2013.01)

(58) Field of Classification Search
CPC .... B65G 1/1371; B65G 1/1373; G06Q 50/28; G05D 1/0088; G05D 2201/0216; G05D 1/0297
USPC ......................................... 700/213–216, 228
See application file for complete search history.

(56) References Cited

U.S. PATENT DOCUMENTS

| | | | |
|---|---|---|---|
| 6,061,607 A | 5/2000 | Bradley et al. | |
| 7,261,511 B2 | 8/2007 | Felder et al. | |
| 7,996,109 B2 | 8/2011 | Zini et al. | |
| 8,892,241 B2 | 11/2014 | Weiss | |
| 9,008,829 B2 | 4/2015 | Worsley | |
| 9,242,799 B1 * | 1/2016 | O'Brien | G06Q 10/08 |
| 9,463,927 B1 | 10/2016 | Theobald | |
| 9,535,421 B1 | 1/2017 | Canoso et al. | |
| 9,563,197 B2 | 2/2017 | Stiernagle et al. | |
| 2016/0235236 A1 * | 8/2016 | Byers | A47G 29/141 |
| 2017/0330269 A1 | 11/2017 | Kanellos et al. | |

* cited by examiner

*Primary Examiner* — Yolanda R Cumbess
(74) *Attorney, Agent, or Firm* — Theodore M. Magee; Westman, Champlin & Koehler, P.A.

(57) ABSTRACT

A computer-implemented method includes receiving an indication that an order scheduled for later pickup is to be picked up earlier than scheduled. A plurality of robots that are holding items that form at least part of the order are then identified and instructed to move immediately to a pickup location and to make the items of the order held by the plurality of robots available for retrieval from the plurality of robots.

21 Claims, 16 Drawing Sheets

ROBOTIC ORDER PICKING

REFERENCE TO RELATED APPLICATION

The present application claims priority from U.S. Provisional Application 62/697,623 filed on Jul. 13, 2018, the contents of which is hereby incorporated by reference in its entirety.

BACKGROUND

Retail stores traditionally receive products from distribution centers, place those products on display shelves, and allow customers to walk through the retail store to select the products they wish to purchase. Some retail stores provide additional services including picking and packaging items on behalf of customers and then either shipping the items to the customer or allowing the customer to pickup the packaged items in a designated location at the retail store. The process of picking items off the retail shelves and packaging them is labor intensive and inefficient.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving an indication that an order scheduled for later pickup is to be picked up earlier than scheduled. A plurality of robots that are holding items that form at least part of the order are then identified and instructed to move immediately to a pickup location and to make the items of the order held by the plurality of robots available for retrieval from the plurality of robots.

In accordance with a further embodiment, a method includes instructing a plurality of picking robots containing items for a plurality of orders to provide access to items associated with one order of the plurality of orders and instructing a rebin robot to provide access to a space in the rebin robot that will receive items of the one order. An indication that items for the one order have been moved from the plurality of picking robots to the area in the rebin robot is then received.

In accordance with a still further embodiment, a robot includes an access control, limiting access to a space within the robot and a space adjustment module that can alter the volume of the space within the robot.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the embodiments below, a system is provided for improving the efficiency of picking items from retail store shelves to include in orders that are to be shipped or picked up. In additional embodiments, a system is provided for improving the efficiency of restocking items.

Figure 1:
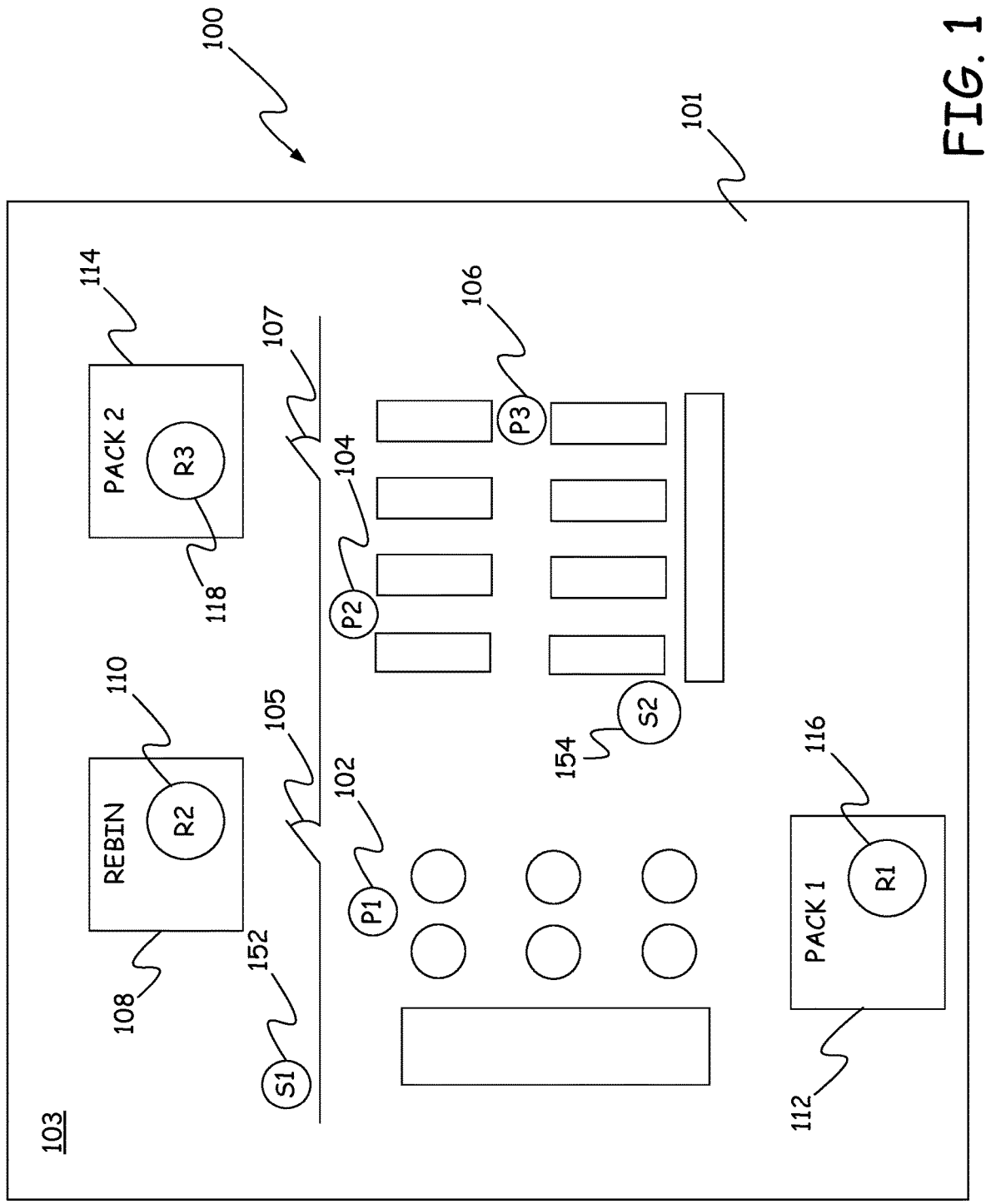
FIG. 1 is a plan view of a retail store.

FIG. 1 shows a plan view of a retail store 100 showing three picking robots 102, 104 and 106 positioned at different locations on a sales floor 101. In accordance with the various embodiments, employees pick items from various displays on the sales floor and place them into spaces or compartments within each picking robot. The picking robots are typically loaded with items for multiple orders and then the robots move to a rebin area 108. Within rebin area 108, a rebin robot 110 is used to aggregate the items of each order such that items from different picking robots for the same order are taken from those picking robots and placed into a space in the rebin robot assigned for the order. When rebin robot 110 is full or when one of the orders within the rebin robot must begin a packing process to meet a scheduled delivery time or pickup time, the rebin robot travels to a packing area, such as packing area 112 associated with order pickup or packing area 114 associated with order shipment.

As shown in FIG. 1, packing area 112 contains a rebin robot 116 and packing area 114 includes a rebin robot 118. When a rebin robot reaches a packing area, items for each order carried by the rebin robot are removed from the rebin robot and are packaged for shipment or for pickup. Thus, rebin robot 116 is in the process of having items it holds packaged for pickup and rebin robot 118 is in the process of having items it holds packaged for shipment. In accordance with one embodiment, packing area 112 is located on sales floor 101 so that customers can easily reach packing area 112 and pickup their orders. Packing area 114 and rebin area 108 are shown as being in a backroom 103, which is accessible by swinging doors 105 and 107. By using rebin area 108 and rebin robots 116 and 118, picking robots 102, 104 and 106 do not need to travel to both packing area 112 and packing area 114. Instead, the picking robots simply have to travel to rebin area 108. This reduces the amount of time that the rebin robots are not on sales floor 101 and thereby improves the efficiency of picking items for orders.

In accordance with some embodiments, when a customer arrives early for their order, picking robots 102, 104 and 106 containing items for that order can be recalled directly to packing area 112 to provide immediate access to the items of the order.

FIG. 1 also shows two restocking robots 152 and 154. Restocking robot 152 is shown positioned in backroom 103 where an employee loads robot 152 with items to restock display units on sales floor 101. When robot 152 is full or when a restocking task has been selected by a sales floor employee, robot 152 travels to a display unit on sales floor 101 that requires restocking. In FIG. 1, restocking robot 154 represents a robot that has moved from backroom 103 to sales floor 101 so that a sales floor employee can access items in robot 154 to restock a display unit.

Figure 2:
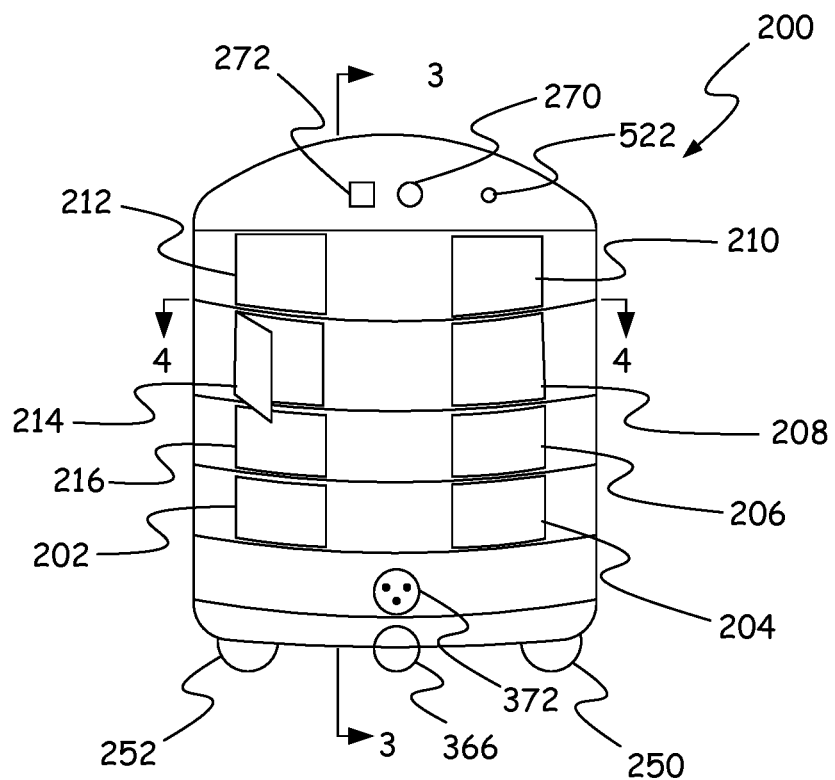
FIG. 2 is a side view of a robot in accordance with one embodiment.
Figure 3:
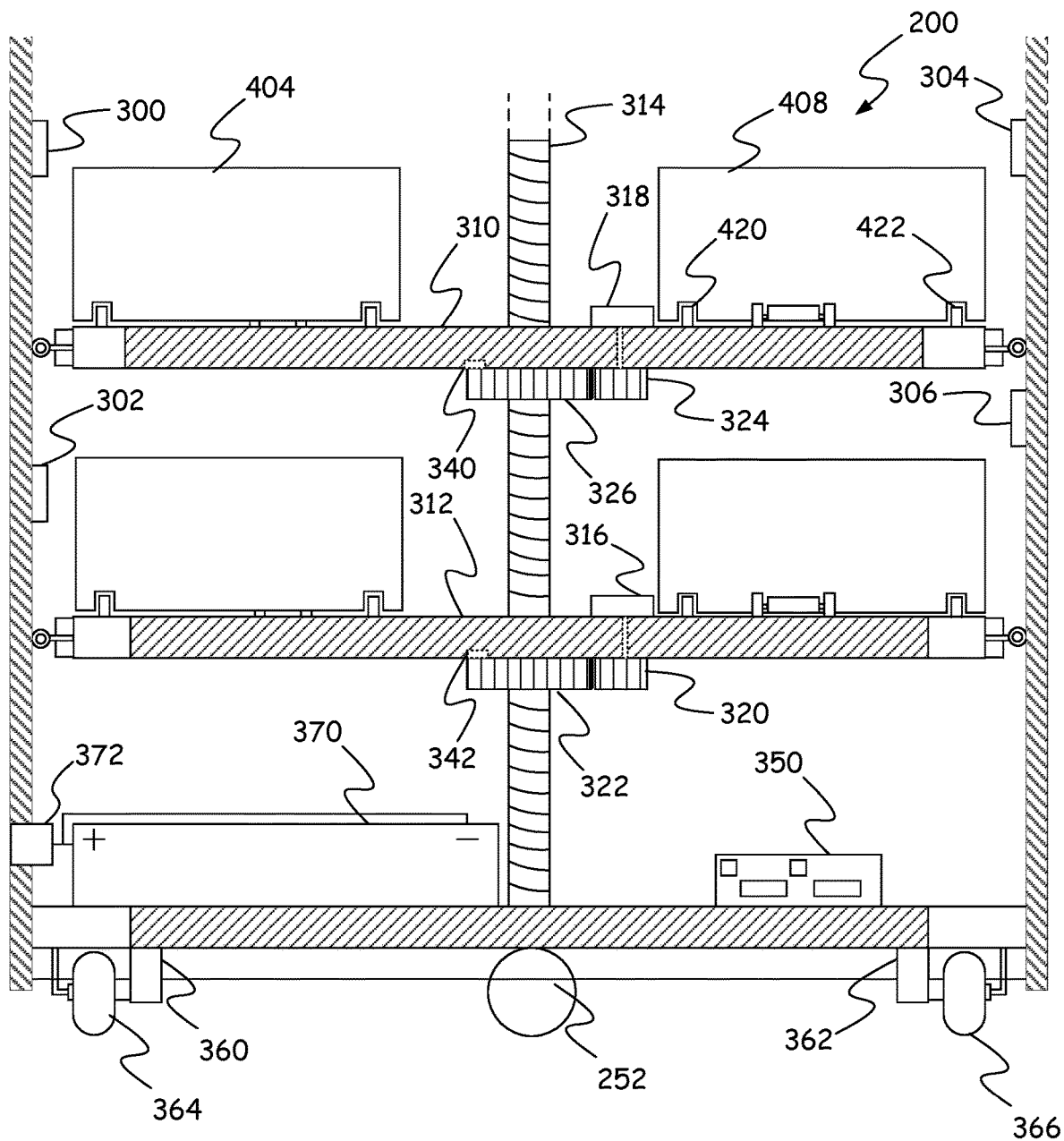
FIG. 3 is a side sectional view of the robot of FIG. 2.
Figure 4:
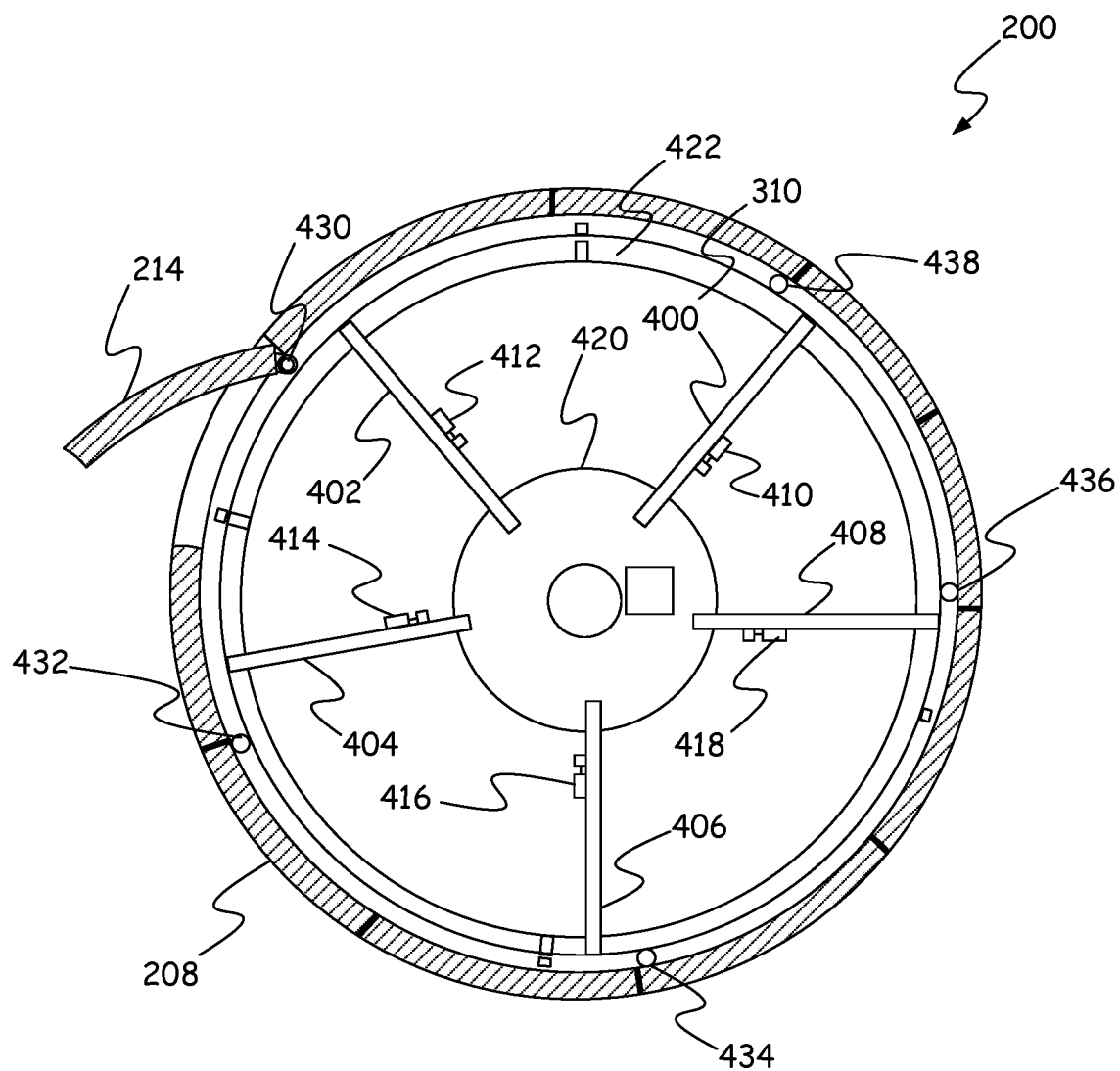
FIG. 4 is a top sectional view of the robot of FIG. 2.

FIG. 2 provides a side view, FIG. 3 provides a side sectional view, and FIG. 4 provides a top sectional view of an example robot 200 that can be used as a picking robot or a rebin robot in accordance with the various embodiments. Robot 200 includes a collection of doors, such as doors 202, 204, 206, 208, 210, 212, 214 and 216, which each act as access control devices for a separate space/compartment within robot 200. Each of the doors is controlled by an actuator, such as actuators 300, 302, 304, and 306 of FIG. 3 and actuators 430, 432, 434, 436 and 438 of FIG. 4, such that robot 200 is able to open and close the doors. Although pivoting doors are shown in FIGS. 2-4, in other embodiments, sliding doors or slidable drawers are provided to control access to the internal spaces of robot 200.

As shown in FIG. 3, robot 200 includes a collection of adjustable shelves, such as shelves 310 and 312 that robot 200 can move upward and downward along a threaded central pole 314 using shelf motors, such as motor 316 for shelf 312 and motor 318 for shelf 310. Motor 316 drives a gear 320, which in turn drives gear 322 to move up and down along threaded pole 314. Similarly, motor 318 drives a gear 324, which in turn drives gear 326 to move up and down central threaded pole 314.

Each shelf includes a collection of movable dividers, such as dividers 400, 402, 404, 406 and 408 of shelf 310. Each movable divider is moved by a respective motor, such as motors 410, 412, 414, 416 and 418 by driving wheels that engage the shelf. In accordance with one embodiment, each divider includes two grooves that ride along respective tracks, such as track 420 and 422 on shelf 310. Each shelf also includes a load cell such as load cells 340 and 342 of shelves 310 and 312. Each load cell measures a load placed on the respective shelf and thereby provides a measure of the weight of the items placed on the shelf.

A processor in a circuit board 350 of robot 200 controls the shelf motors and the divider motors to adjust the internal spaces within robot 200 to accommodate items for orders. In general, the space between two dividers along any one shelf is limited to receiving items for a single order at a time. If additional space is needed for an order, the processor on circuit board 350 instructs the motor for the shelf to lower and/or instructs one or more of the dividers to move.

The processor on circuit board 350 is also able to move robot 200 to any desired location within the retail store by controlling wheel motors, such as wheel motors 360 and 362, which drive wheels 364 and 366. Additional spherical bearings 250 and 252 are provided to stabilize robot 200. Robot 200 also includes a rechargeable battery pack 370, which can be recharged using a charging interface 372 shown in FIG. 2.

Robot 200 also includes one or more sensors such as a camera 270, a proximity sensor 272 and a barcode scanner 522. Although only a single camera and a single proximity sensor are shown, those skilled in the art will recognize that multiple cameras and multiple proximity sensors may be provided to improve the robot's ability to sense its environment.

Figure 5:
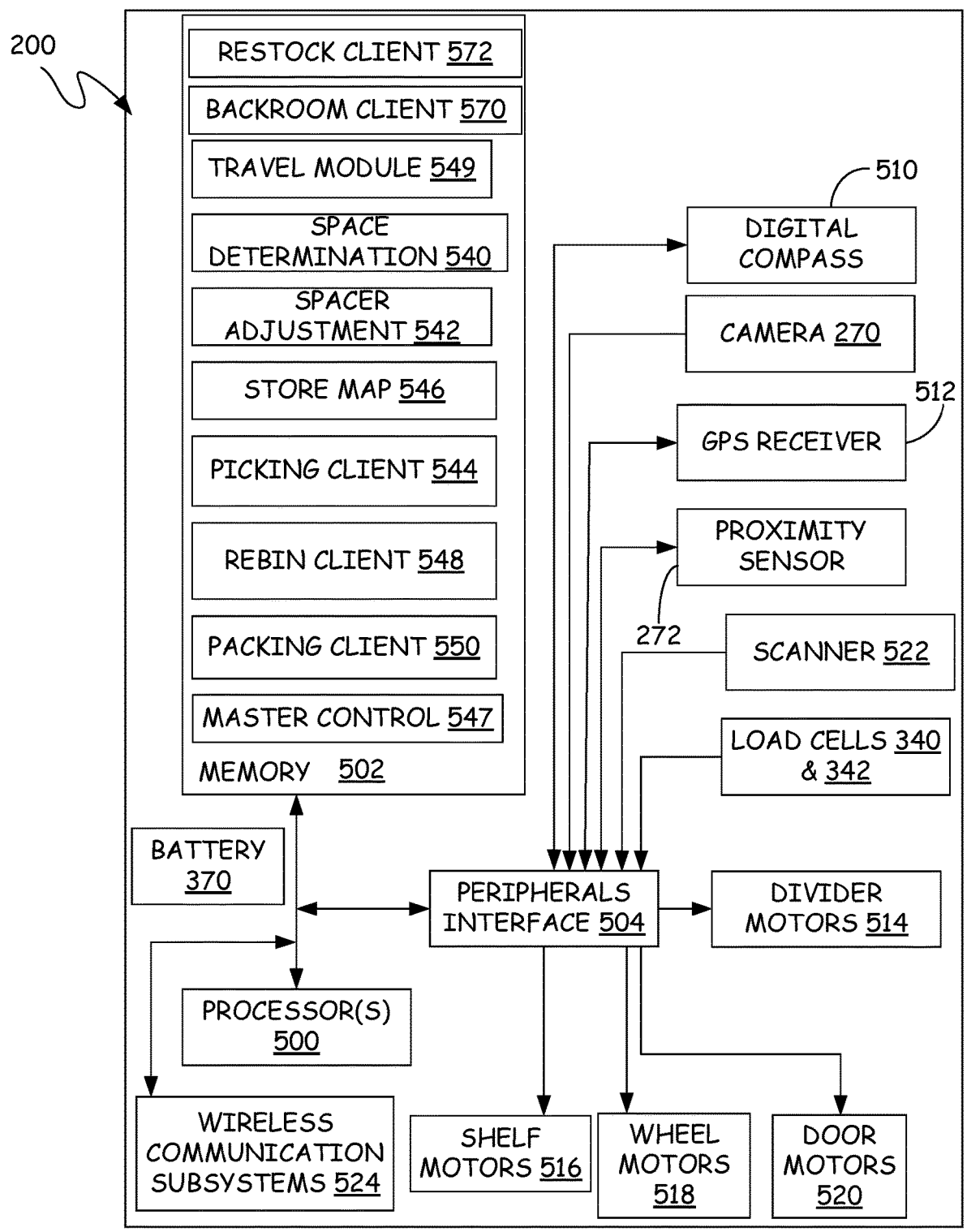
FIG. 5 is a block diagram of components of a robot in accordance with one embodiment.

FIG. 5 provides a block diagram of the elements of robot 200 showing a processor 500, a memory 502 and a peripherals interface 504. Processor 500 receives information from proximity sensor 272 and cameras 270 through peripherals interface 504. In addition, processor 500 can receive orientation information from a digital compass 510 and position information from a GPS receiver 512 to determine the current orientation and position of robot 200. Processor 500 can also control the various motors within robot 200 through peripherals interface 504. In FIG. 5, the various divider motors are shown collectively as divider motors 514, the various shelf motors are shown in shelf motors 516, the various wheel motors are shown as wheel motors 518 and the various door motors are shown as door motors 520. In accordance with one embodiment, robot 200 also includes a barcode scanner 522 that can be used to scan the barcodes on various items for sale in the retail store. Processor 500 receives the scanned data from scanner 522 through peripherals interface 504.

In accordance with one embodiment, robot 200 is able to communicate with one or more computer networks through a wireless communication subsystem 524 using one or more wireless network protocols such as WiFi and Bluetooth, for example.

In accordance with one embodiment, each order is processed by first receiving the order, then setting one or more picking tasks to pick items for the order and place them in picking robots. After the items have been picked, rebin tasks are assigned to aggregate the items of the order and then a packing task is assigned to package the items of the order carried by the rebin robot.

Figure 6:
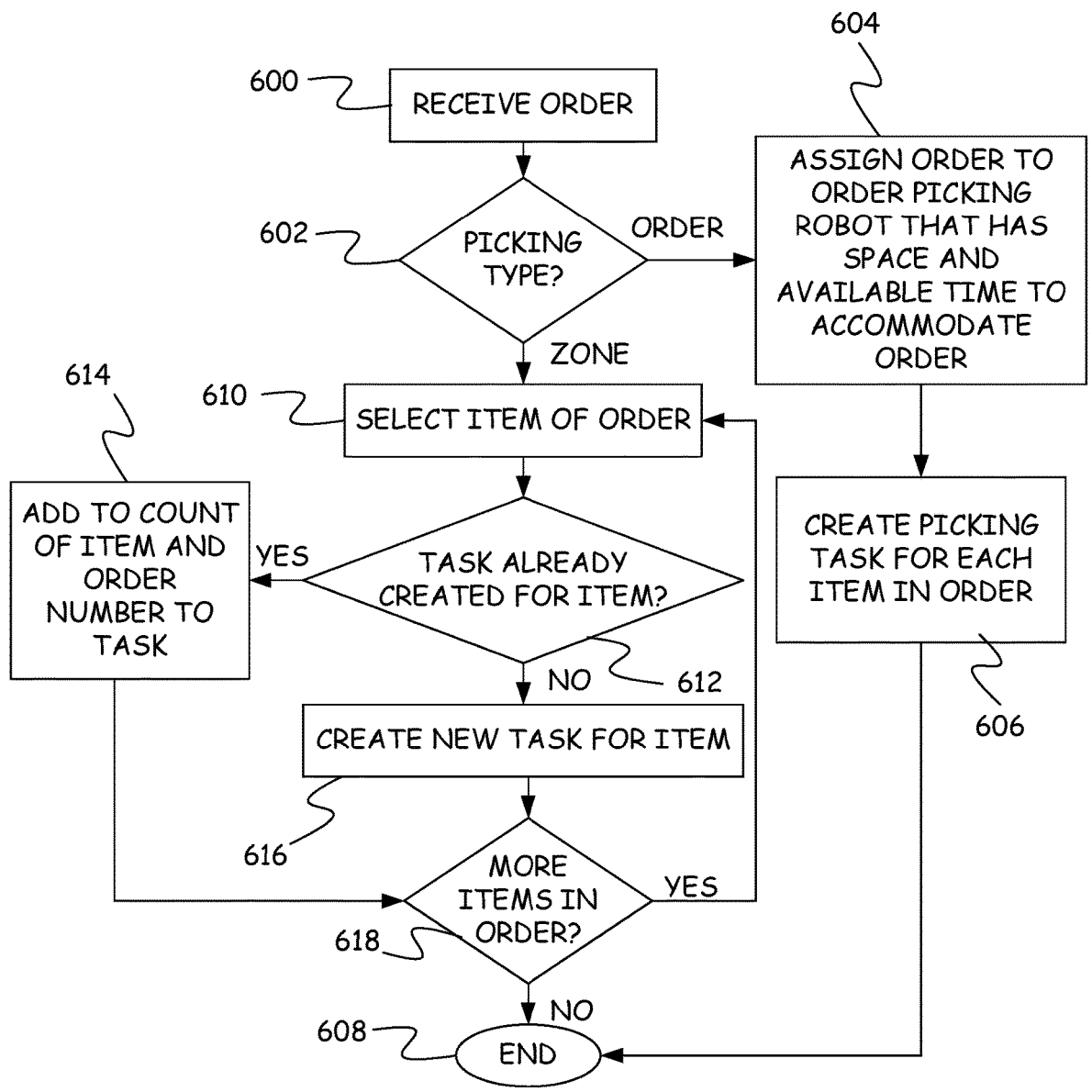
FIG. 6 is a flow diagram of a method for receiving orders and generating tasks.
Figure 7:
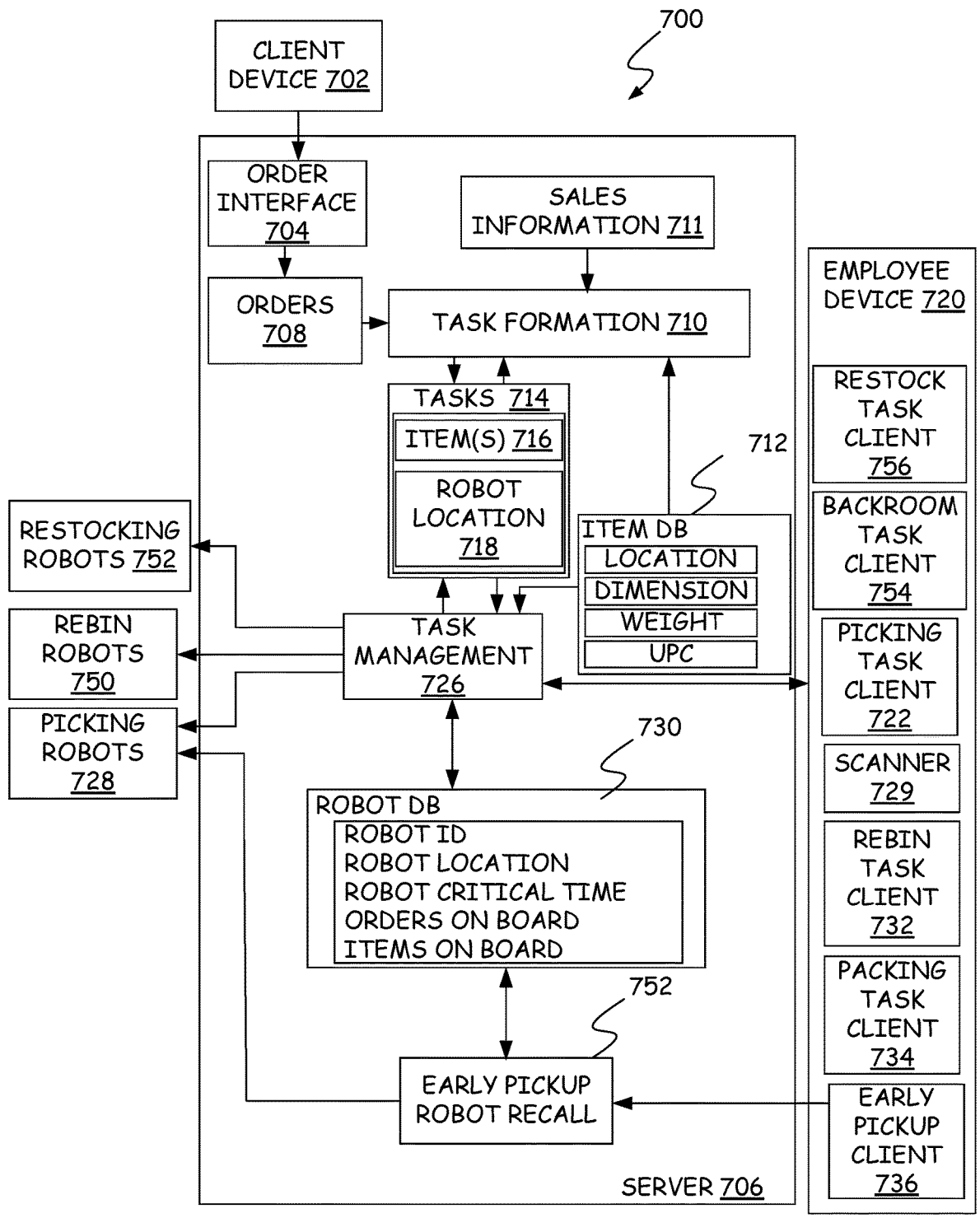
FIG. 7 is a block diagram of a system in accordance with one embodiment.

FIG. 6 provides a flow diagram for receiving orders and setting picking tasks. FIG. 7 provides a block diagram of a system 700. In step 600, an order is received from a client device 702 through an order interface 704 on a server 706. The received order 708 includes a list of one or more items and an indication of whether the order is to be shipped or picked up by the consumer. In accordance with one embodiment, order interface 704 is a web application that can be executed either within a mobile client device 702 or a desktop client device 702. At step 602, a task formation module 710 in server 706 determines what type of picking tasks are to be created. In accordance with one embodiment, there are two different types of picking tasks. The first is an order-based picking task in which each picking task is associated with a separate order and involves selecting one or more items for the order in order to complete the picking task. The other type of picking task is a zone-based picking task in which each task involves picking one or more units of a single item where different units of the item may be associated with different orders.

If the picking type is an order-based picking type, task formation module 710 first identifies a respective picking robot that can accommodate the order at step 604. In accordance with one embodiment, each picking robot is assigned a single order when performing order-based picking. In such embodiments, identifying a picking robot that can accommodate the new order involves identifying a robot that is currently available and that has space for all of the items in the order. In accordance with further embodiments, multiple orders can be assigned to a single robot so that the order-based picking is performed for a batch of orders. In such embodiments, the robot receives items for different orders in an interleaved fashion based on the location of the robot in the store. In such embodiments, identifying a picking robot that can accommodate a new order involves identifying an available robot that has space to accommodate all of the orders currently assigned to the robot as well as space for the new order. In addition, the robot must have enough time to complete all of the picking tasks for the orders previously assigned to the robot and for the new order. To determine this, task formation module 710 estimates how long it will take to complete all of the picking tasks assigned to the robot if the new order is added to the robot including travel time for the robot to move to the locations of the order items, delays before an employee accepts a picking task, and the time needed for an employee to complete the picking task. It then compares this time to the amount of time until the earliest critical time of any of the orders assigned to the picking robot. If the estimated time to complete the tasks is less than the time until the earliest critical time, the picking robot can accommodate the new order.

After a picking robot has been assigned the order, a picking task is created for each item in the order at step 606 After each item in the order has been assigned to a picking task, the order-based task formation process of FIG. 6 ends at step 608.

If at step 602, zone-type tasks are to be created instead of order-based tasks, an item of the order is selected at step 610. At step 612, task formation module 710 determines if a task has already been created for the selected item. Such a task would have already been created if a different order included the same item. If a task has already been created for the item, the count of the number of units of the item needed to complete the task is increased at step 614 and an identifier for the order is included in the task. If a task has not already been created for the item at step 612, a new task is created for the item at step 616. After step 614 or 616, task formation module 710 determines if there are more items in the order at step 618. If there are more items in the order, task formation module 710 returns to step 610 to select the next item of the order. After all the items in the order have been processed at step 618, the process of FIG. 6 ends at step 608. The result of FIG. 6 is a set of tasks 714 that designate items to be picked 716 and a robot location 718 where the items are to be taken to. In some embodiments, each task also includes an identification of the order or orders associated with the task.

Figure 8:
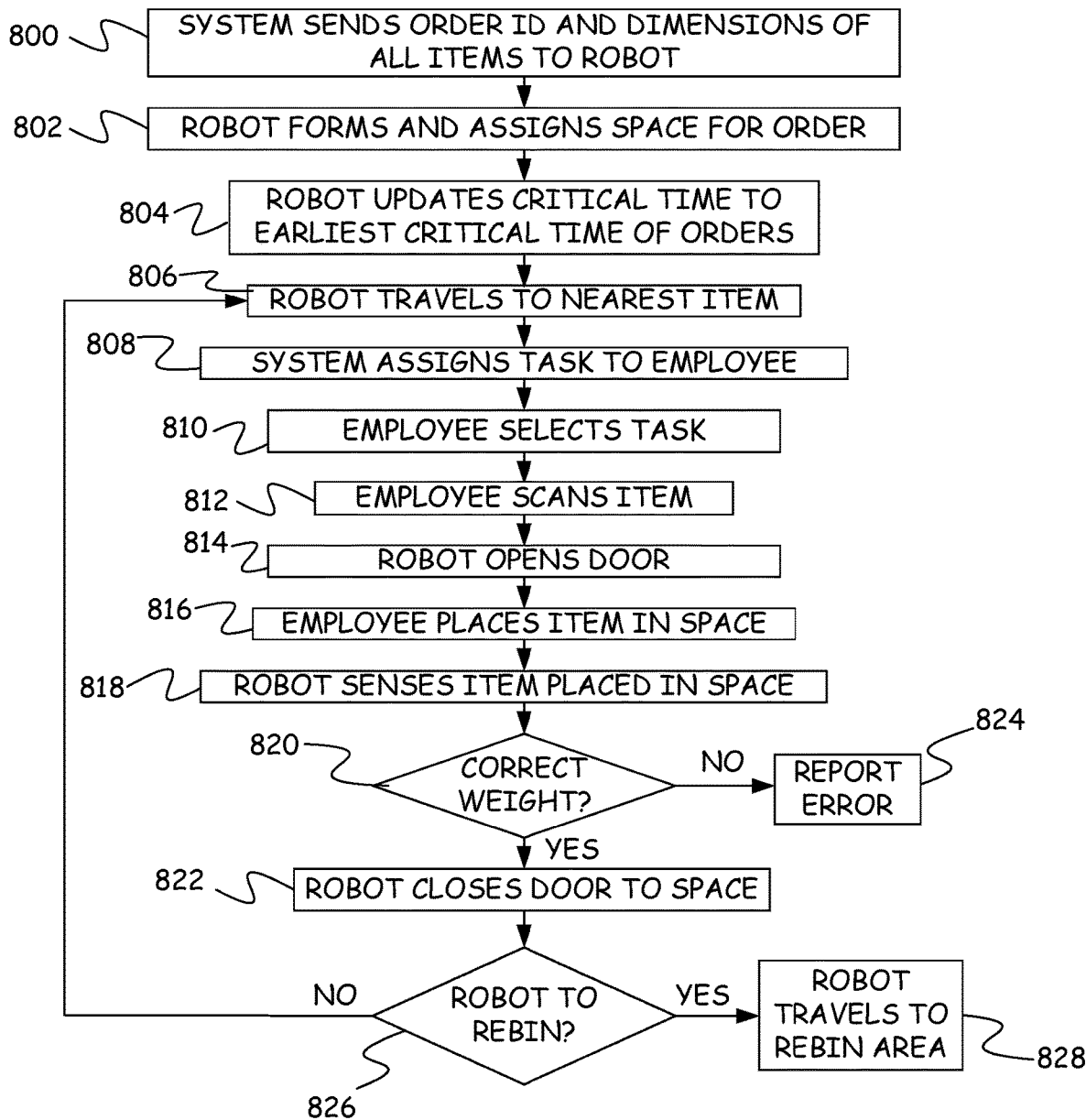
FIG. 8 is a flow diagram of a method of executing picking tasks in accordance with one embodiment.

After at least one picking task has been set, a task management module 726 can assign the task to an employee. FIG. 8 provides a flow diagram of a method of performing a batch of order-based picking tasks that have been assigned to a picking robot by task management 726. At step 800, task management module 726 sends order information to the picking robot. In accordance with one embodiment, this order information includes the order identifier of each order assigned to the picking robot together with the location, dimensions and weight of each item in each order. At step 802, a space determination module 540 in the picking robot determines a space needed for each order based on the dimensions of the items in the order and a space adjuster module 542 adjusts one or more shelves and dividers in the robot to create the needed spaces for each order, which are then assigned to the respective orders. If such adjustments are insufficient on their own to provide enough space for the order, space adjustment 542 can assign multiple spaces within the robot for a single order. At step 804, the picking robot updates its critical time to the earliest critical time of all orders assigned to the robot. At step 806, picking client 548 on the robot is initiated and causes the robot to travel to the nearest item of all items in any of the orders assigned to the robot. To do this, picking client 544 determines the current location of the picking robot within the store using store map 546 and GPS receiver 512 and compares that location to the location of each item in each order assigned to the picking robot to identify the closest item. Picking client 544 then sends instructions to travel module 549 to move to the location of the closest item. Travel module 549 uses store map 546 to identify a path from its current location to the location of the closest item and uses GPS receiver 512, digital compass 510, cameras 270 and proximity sensors 272, to safely guide robot 728 along the path to the closest item.

At step 808, task management module 726 assigns the task of picking the closest item to an employee. In accordance with one embodiment, task management module 726 assigns the task to an employee who is closest to the item. At step 810, the employee uses an employee device 720 to select the assigned picking task. Selecting the picking task causes a picking task client module 722 to execute on employee device 720. Picking task client module 722 displays information about the item that is to be picked including the item's location, name, size and appearance.

At step 812, the employee picks an item in the task from a display and scans the item using either scanner 522 on the robot or a scanner 729 on employee device 720. At step 814, task management 726 forwards the scan information to picking client 544 on robot 728, which causes picking client 544 to open a door to the assigned space for the order and at step 816 the employee places the item in the space. In accordance with one embodiment, each picking robot only provides access to a single order's space(s) at any one time. Thus, picking robot only opens doors to spaces associated with a single order at a time. At step 818, picking client 544 receives a value from the load cell below the shelf of the order's space and uses the value to determine that the item has been placed on the shelf and the weight of the item. At step 820, picking client 544 compares the weight determined from the load cell value to the expected weight of the item to determine if the correct item has been placed in the robot. If the weights do not match, picking client 544 reports the error to the employee either through device 720 or on a display on robot 728 at step 824. If the measured weight of the item and the expected weight of the item are substantially similar at step 820, robot picking client 544 closes the door to the space at step 822.

At step 826, a master control module 547 in picking robot 728 determines if picking robot 728 needs to return to the rebin area. In accordance with one embodiment, the robot will return to the rebin area if the critical time for the robot has passed or if all of the items for all of the orders have been picked. If picking client 544 determines that the robot needs to return to the rebin area, travel module 549 controls wheel motors 518 to cause the robot to travel to the rebin area at step 828. In accordance with one embodiment, travel module 549 uses store map 546 to identify a path from its current location to the rebin area and uses GPS receiver 512, digital compass 510, cameras 270 and proximity sensors 272, to safely guide robot 728 along the path to the rebin area.

If the robot does not need to return to the rebin area at step 826, picking client 544 causes the robot to travel to the nearest item to be picked by returning to step 806. Steps 808-826 are then repeated until the robot is ready to return to the rebin area at step 828.

Figure 9:
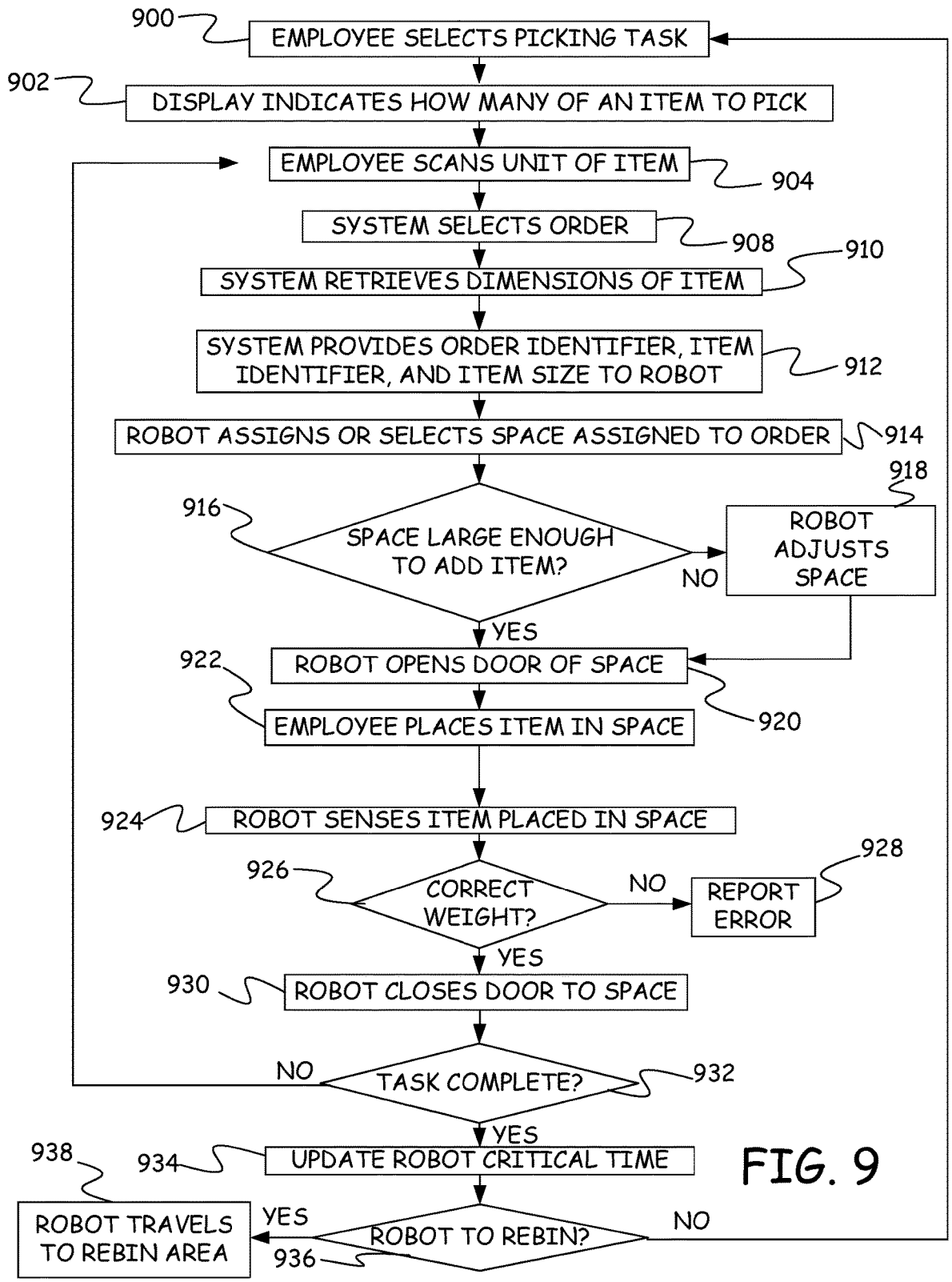
FIG. 9 is a flow diagram of a second method of executing picking tasks.

FIG. 9 provides a flow diagram of a method of performing zone-type picking tasks in accordance with one embodiment. In step 900, an employee uses employee device 720 to select a picking task causing picking task client 722 to begin operating on employee device 720. In response, task management 726 on server 706 retrieves the corresponding task 714 and returns the number of units of an item associated with the task that are to be picked by the employee. Task management 726 also notifies picking robot 728 that a zone-type picking task has been selected which causes picking client 544 on robot 728 to be started. Picking task client 722 on employee device 720 displays the item assigned to the selected picking task and the number of units of the item that are to be picked at step 902. At step 904, the employee scans one of the units of the item using either scanner 729 on the employee device 720 or scanner 522 of picking robot 728. At step 908, task management 726 selects an order in the task that the item is assigned to. Task management 726 then retrieves the dimensions of the item from item database 712 at step 910. Task management 726 provides the order identifier, the item identifier, and the item size to robot 728 at step 912.

At step 914, picking client 544 of robot 728 identifies a space within the robot for the item. If robot 728 has previously created a space for the current order, robot 728 identifies that space. If robot 728 has not previously created a space for the current order, robot 728 selects an available space within the robot for the item. At step 916, space determination module 540 is used to determine if the space assigned to the order is large enough to add the scanned item. If space determination module 540 determines that the space is not large enough, space adjustment module 542 is called at step 918 to adjust the volume of the space by changing the position of one or more shelves and/or changing the position of one or more dividers within the robot. If the space is determined to be large enough or after the space has been adjusted, picking client 544 opens the door of the space at step 920 and the employee places the item in the space at step 922. As noted above, in accordance with one embodiment, the picking robot only opens the door for one order's space(s) at a time to prevent items being placed in the wrong space. At step 924, picking client 544 receives a value from the load cell below the shelf of the order's space and uses the value to determine that the item has been placed on the shelf and the weight of the item. At step 926, picking client 544 compares the weight determined from the load cell value to the expected weight of the item to determine if the correct item has been placed in the robot. If the weights do not substantially match, picking client 544 reports the error to the employee either through device 720 or on a display on robot 728 at step 928. If the measured weight of the item and the expected weight of the item are substantially similar at step 926, robot picking client 544 closes the door to the space at step 930.

At step 932, if the task is not complete yet, the employee returns to step 904 to scan another unit of the item. Steps 904 through 932 are then repeated. When all of the units of the item have been scanned and placed into the robot, the task is considered to be complete at step 932 and the robot critical time is updated at step 934. In particular, if the task involves placing an item in the robot for an order that had not previously been in the robot, the critical time of the new order is compared to the robot critical time to see if the critical time of the new order is earlier than the robot critical time. If the critical time of the new order is earlier than the robot critical time, the robot critical time is updated to the critical time of the new order at step 934.

At step 936, master control 547 of robot 728 determines if the robot needs to return to the rebin area. This determination involves determining whether the robot critical time has passed and whether the robot is full. If the critical time has passed or the robot is too full to accommodate additional orders, the robot travels to the rebin area at step 938 using travel module 549. If the robot does not need to return to the rebin area at step 936, the process continues at step 900 where the employee selects the next picking task.

Figure 10:
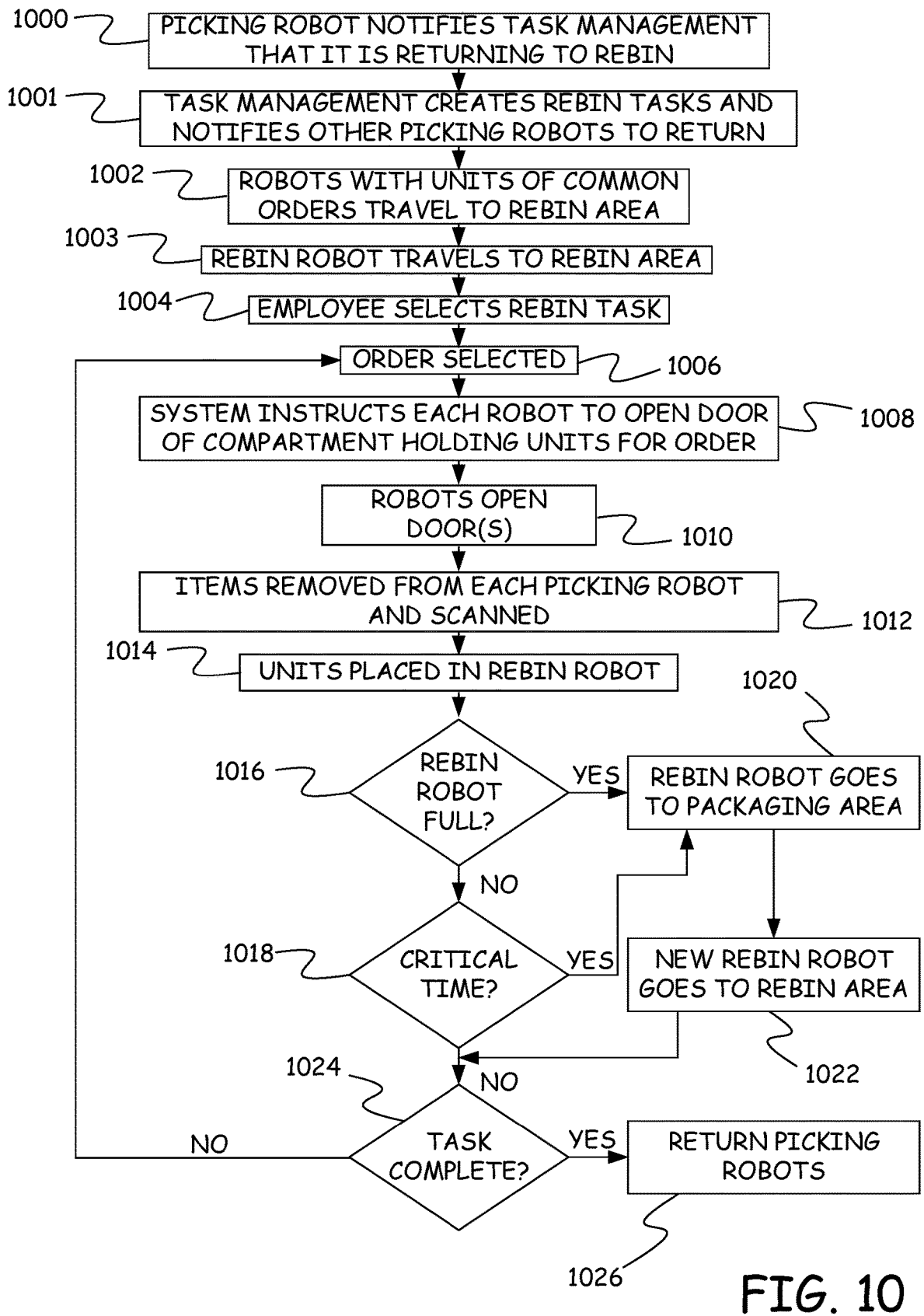
FIG. 10 is a flow diagram of a method of aggregating orders into a rebin robot in accordance with one embodiment.

Since the picking robots are located at different positions within the store, items in a single order may be placed in different picking robots. These items must be brought together as part of completing the order. FIG. 10 provides a flow diagram of a method of aggregating items for one or more orders that are spread across multiple picking robots.

Figure 11:
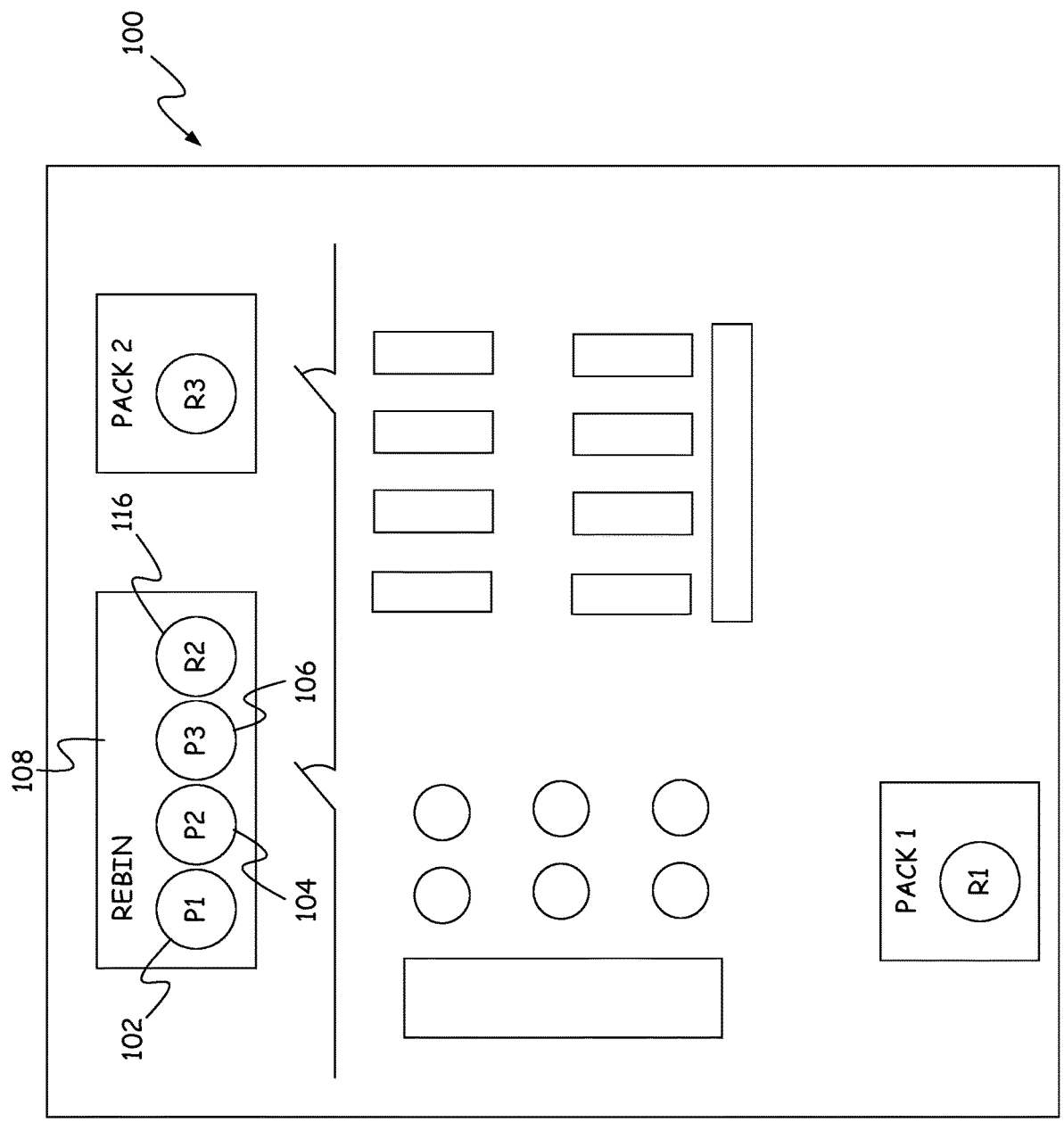
FIG. 11 is a plan view of a retail store showing a rebining operation.

At step 1000 of FIG. 10, a picking robot that needs to return to the rebin area notifies task management 726 that it is moving to the rebin areas and provides the order identifiers of all of the orders that the picking robot is carrying. At step 1001, task management 726 examines the orders being carried by the picking robot and creates a rebin task for each order. In addition, task management 726 instructs each picking robot that contains at least one item of an order in the returning picking robot to also return to the rebin area. At step 1002, all of the instructed picking robots move to the rebin area. For example, in FIG. 11, picking robots 102, 104 and 106 have all traveled to rebin area 108. At step 1003, if a rebin robot is not currently in rebin area 108, a robot travels to rebin area 108 and is designated as a rebin robot 750.

At step 1004, an employee uses employee device 720 to select a rebin task causing a rebin task client 732 to begin executing on employee device 720 and causing a rebin client 548 to begin executing on rebin robot 750 and on each picking robot 728 in rebin area 108. At step 1006, task management 726 identifies an order carried by one or more of the picking robots and selects that order for processing. At step 1008, task management module 726 instructs each robot to open a door of the compartment(s) holding units for the selected order. In accordance with one embodiment, this instruction involves passing an identifier for the order to all of the picking robots and the rebin robot. At step 1010, if a picking robot contains any items for the identified order, the robot opens the doors of any area within the robot containing items for the order. Note that the picking robots and rebin robot only open doors to one order's spaces at any one time so that only items for a single order can be removed. This prevents items from other orders accidentally being mixed together. At step 1012, items are removed from the picking robot and are scanned before being placed in the rebin robot at 1014. In accordance with one embodiment, the scan of the item is received by task management 726 and indicates that the item has been placed in the rebin robot. In other embodiments, the rebin robot includes one or more sensors that can detect when an item is placed in the rebin robot and upon a scanned item being inserted in the rebin robot, the rebin robot sends an indication to task management 726 that the rebin robot has received the item.

At step 1016, after all the units from all of the different picking robots have been placed inside the rebin robot, the rebin robot determines if it is full. If the rebin robot is not full, the rebin robot determines if any of the orders that have been placed in the rebin robot are past a packing critical time at step 1018. If the rebin robot is full at step 1016 or if any of the orders were past the packing critical time at step 1018, the rebin robot closes all doors and travels to a packing area at step 1020 and a new robot is assigned by task management 726 to travel to the rebin area and become the new rebin robot at step 1022. If the rebin robot is not full and none of the orders are past the packing critical time at step 1018, task management module 726 determines if the task is complete at step 1024. If the rebining task is not complete, task management module 726 returns to step 1006 and selects a next order carried by at least one of the picking robots. If the task is complete at step 1024, the picking robots are returned to the sales floor at step 1026.

When a rebin robot leaves the rebin area, task management 726 creates a packing task for each order carried by the rebin robot. When the rebin robot reaches a packing area, such as packing areas 114 and 112, an employee in the packing area selects a packing task causing a packing task client 734 to start on employee device 720 and a packing client 550 to start on the rebin robot. Task management 726 then instructs the rebin robot to open the door for a selected order and the employee removes the items for the order from the robot, scans the items, and packages the items for either pickup or delivery. In accordance with one embodiment, the rebin robot only opens doors for a single order's space(s) at a time to prevent items from multiple orders being mixed together. Task management 726 then selects the next order that is being carried by the rebin robot and proceeds in this manner until all of the orders carried by the rebin robot have been packaged.

As an alternative to traveling to a packing area, some rebin robots travel to a customer access area where customers are allowed to access the rebin robot directly. In such embodiments, the customer uses an application on a mobile device to display a barcode on the mobile device that represents the customer's order. The customer then uses scanner 522 on the rebin robot to scan the barcode. Upon scanning the barcode, the rebin robot identifies the order from the barcode and opens the doors of the spaces containing items for the order. The rebin robot then sends a message to server 706 to indicate that the order has been picked up by the customer.

Figure 12:
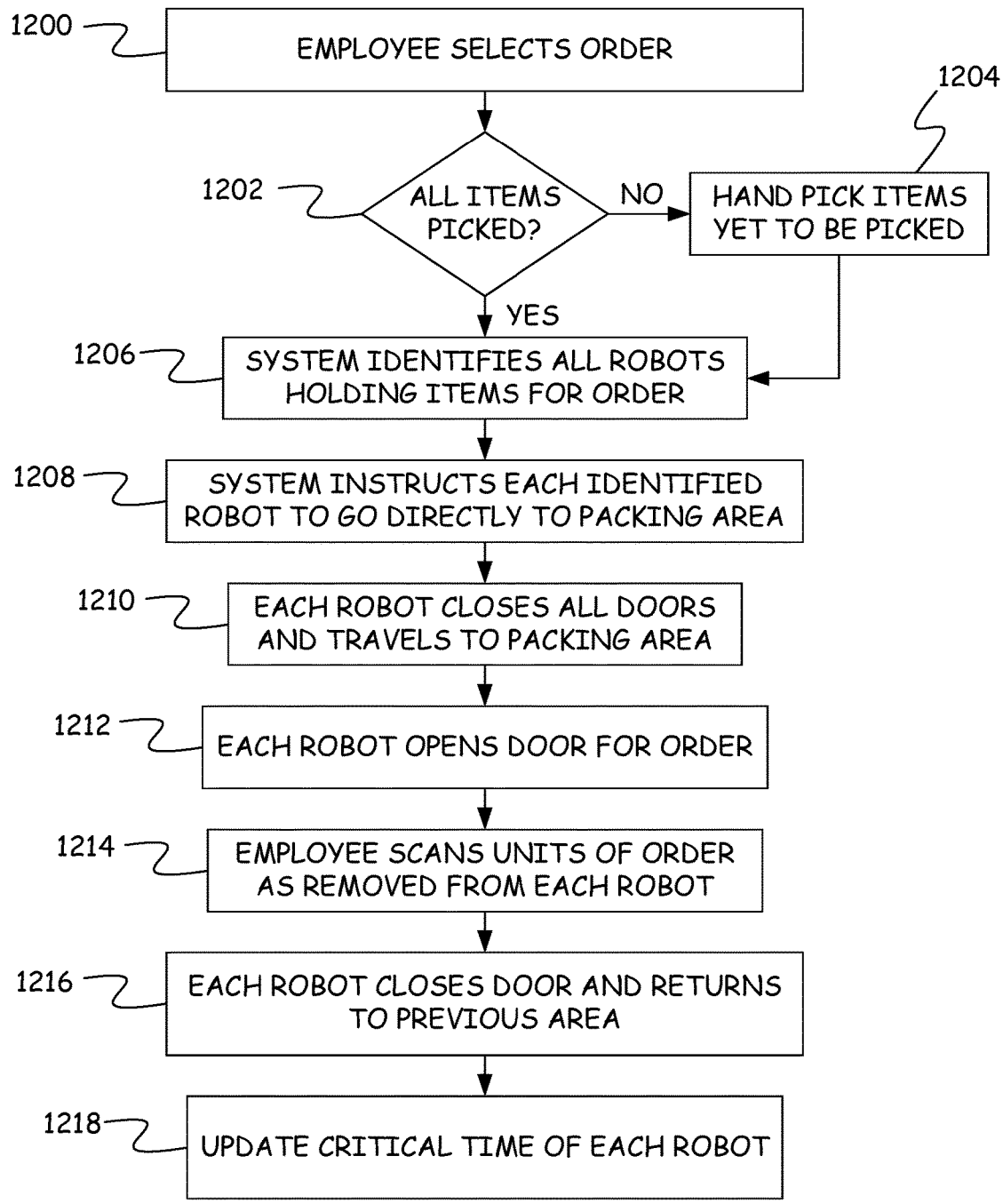
FIG. 12 is a flow diagram of a method of recalling picking robots when an order is being picked up before a scheduled time.

Although customers schedule a time when they will pickup their orders, there will be times when customers arrive early at the retail store. In accordance with one embodiment, a system is provided that allows for the picking robots to be recalled directly to a packing area when a customer desires an earlier pickup of their order. FIG. 12 provides a flow diagram of a method of such an early recall in accordance with one embodiment.

In step 1200 of FIG. 12, the employee uses employee device 720 to start an early pickup client module 736. Within early pickup client module 736, the employee selects an order for early pickup. At step 1202, an early pickup robot recall module 752 in server 706 determines if all items for the order have been placed in a picking robot by examining robot database 730. If some of the items have yet to be picked, early pickup robot recall 752 returns identification information for those items to the employee and instructions the employee to hand pick the items at step 1204. At step 1206, early pickup robot recall 752 identifies all picking robots and rebin robots holding items for the order by examining robot database 730. In accordance with one embodiment, steps 1202 and 1204 are executed at the same time. At step 1208, early pickup robot recall 752 instructs all robots containing items for the order to go directly to the pickup packing area. At step 1210, each instructed robot closes all doors and travels directly to the packing area.

Figure 13:
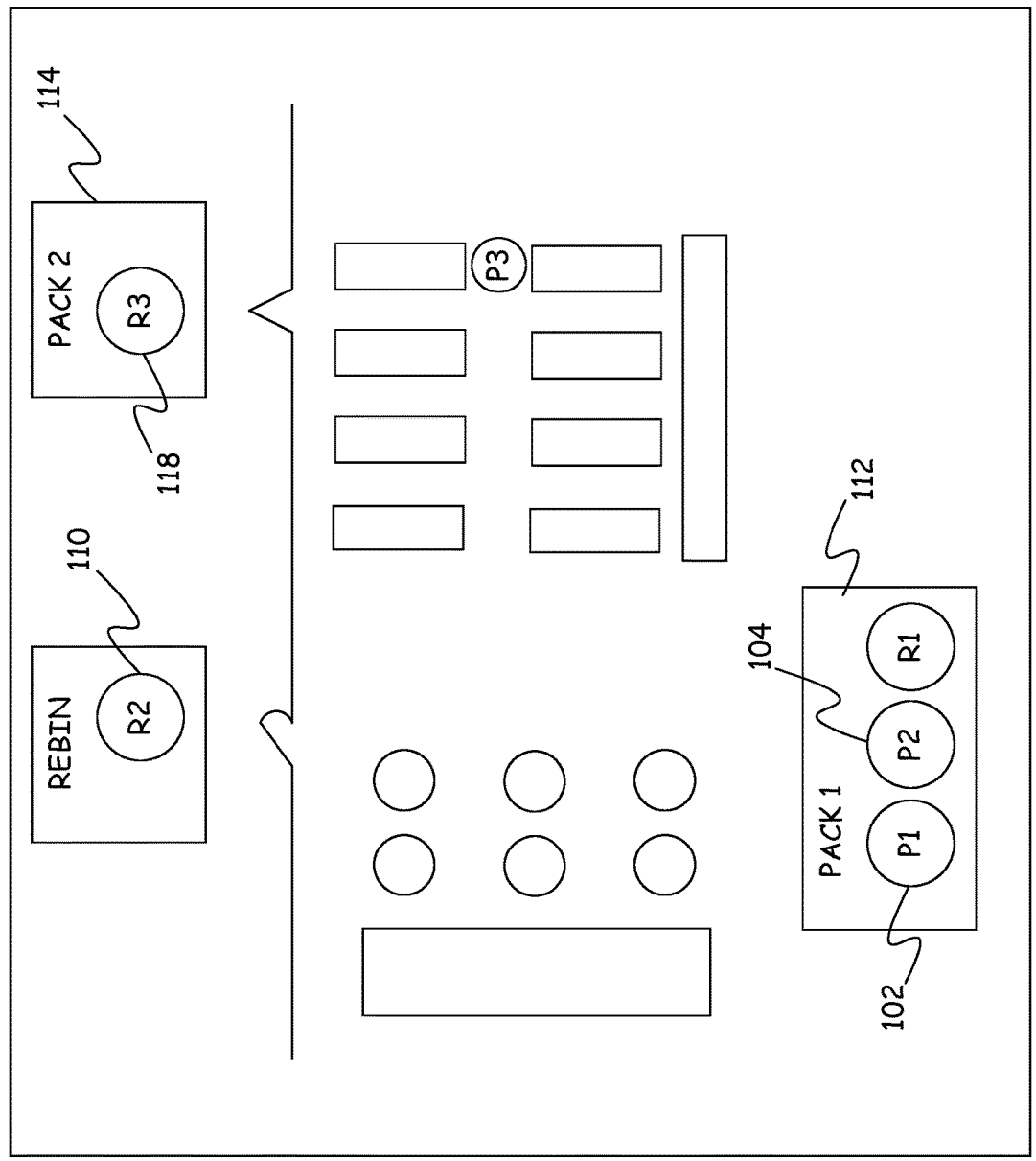
FIG. 13 is a plan view of a retail store showing recalled picking robots.

Upon reaching the packing area, each robot opens the door for the selected order at step 1212. For example, in FIG. 13, picking robot 102 and 104 were instructed to go directly to packing area 112 and upon reaching packing area 112 opened the door to the space of the selected order. In accordance with one embodiment, each of the picking robots contain items for other orders but only open the doors to spaces containing items for the order that is being picked up early so that it is not possible to mistakenly remove items from the robot that belong to other orders. At step 1214, the employee scans the units of the order as they are removed from each robot using either scanner 729 of employee device 720 or scanner 522 on the picking robot. After all of the units of an order have been scanned from a robot at packing area 112, robot recall module 752 instructs the robots to close the doors for the space that contained the items of the order and to return to the robot's previous location before it was recalled at step 1216. At step 1218, robot recall module 752 updates the critical time for each of the robots by determining the earliest critical time of the orders remaining in each robot and setting that earliest time as the critical time for the robot.

Figure 14:
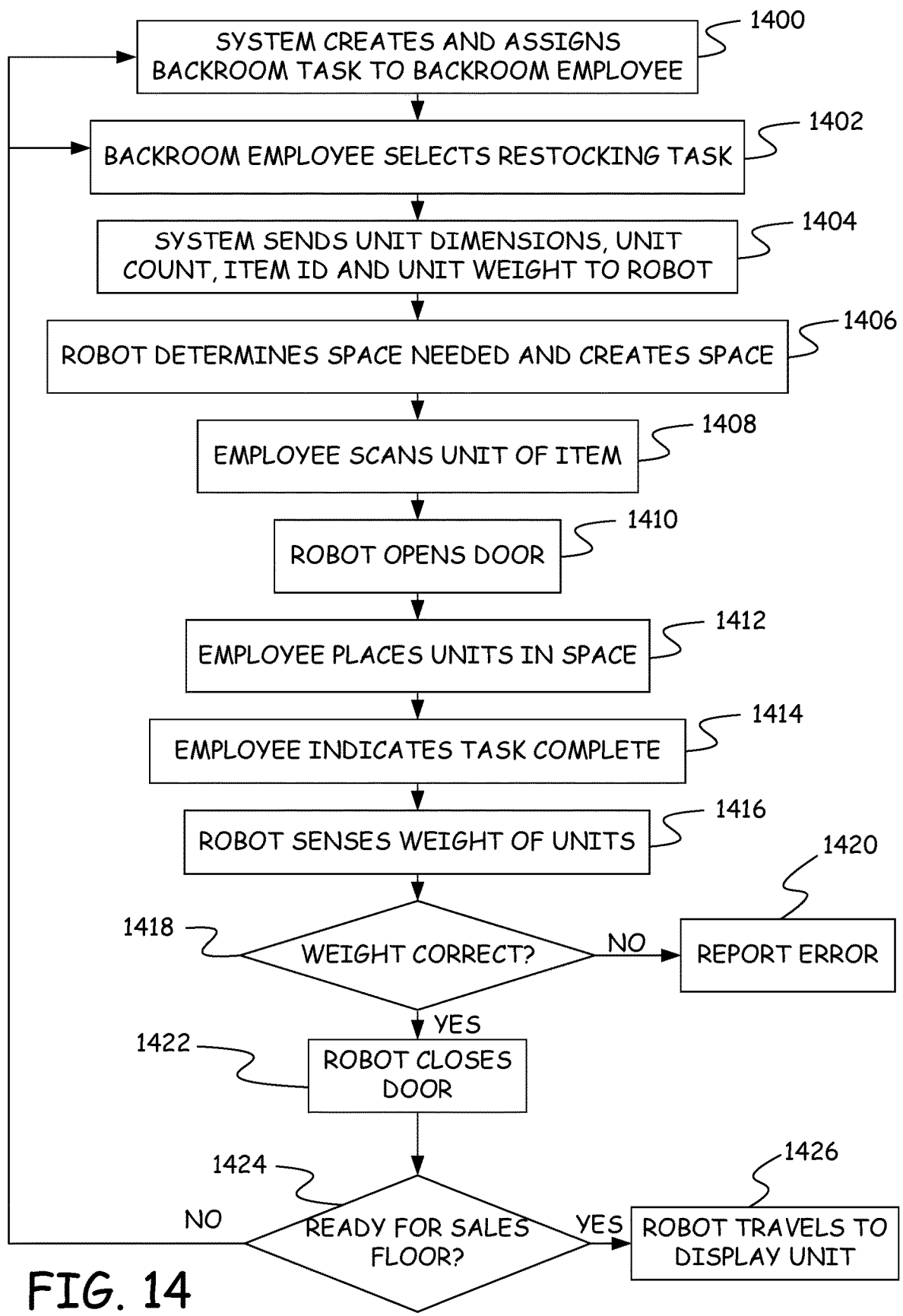
FIG. 14 is a flow diagram of a method of loading a restocking robot.

In accordance with further embodiments, the robots of the various embodiments are used to assist in restocking display units on sales floor 101 with items stored in backroom 103. FIG. 14 provides a flow diagram of a method of performing a backroom task to load a robot with backroom items before sending the robot to sales floor 101. At step 1400, task formation module 710 uses sales information 711 to detect that one or more items on sales floor 101 need to be restocked. For example, task formation module 710 can determine that the number of items sold exceeds a threshold amount that triggers restocking of the item. Based on the determination that an item needs to be restocked, task formation module 710 creates a backroom task 714 indicating an identifier of the item to be restocked, such as the UPC, and the number of units of the item that are to be sent to sales floor 101.

At step 1402, a backroom employee uses an employee device 720 to select an assigned backroom task. Selecting the backroom task causes a backroom task client 754 to execute on employee device 720 and a backroom client 570 to execute on a restocking robot 752, which is an instance of robot 500 of FIG. 5. At step 1404, task management module 726 sends information about the items that are to be restocked to backroom task client module 722. This information includes the dimensions of one unit of each item, the weight of one unit of each item, an item identifier such as the UPC, and the number of units of the item that are to be restocked.

At step 1406, backroom client 570 calls space determination module 540 to determine the total space needed within the robot to accommodate all of the units to be restocked based on the dimensions of one unit of the item and the number of items to be restocked. Space adjuster module 542 adjusts one or more shelves and dividers in restock robot 752 to create the needed spaces for the units to be restocked. If such adjustments are insufficient on their own to provide enough space for the units, space adjustment 542 assigns multiple spaces within the robot for the units.

At step 1408, the backroom employee scans a unit of the item using either scanner 522 on the robot or a scanner 729 on employee device 720. At step 1410, task management 726 forwards the scan information to backroom client 570 on robot 752, which causes backroom client 544 to open door(s) to the assigned space(s) for the item and at step 1412, the employee places all of the units of the item that are to be restocked in the space. In accordance with one embodiment, each backroom robot only provides access to a single item's space(s) at any one time. Thus, backroom robot only opens doors to spaces associated with a single item at a time. The items that are placed in the robot are taken either directly from shelving units in backroom 103 or from carts that were previously loaded with the units.

At step 1414, the employee indicates that the task is complete using backroom task client 754. This indication is forwarded by task management 726 to restock robot 752. In response, at step 1416, backroom client 570 receives a value from the load cell below the shelf of the item's space and uses the value to determine the weight of the units placed on the shelf. At step 1418, backroom client 570 compares the weight determined from the load cell value to the expected weight of all of the units of the item to determine if the correct number of units has been placed in the robot. If the weights do not match, backroom client 570 reports the error to the employee either through device 720 or on a display on robot 752 at step 1420. If the measured weight of the units is substantially similar to the expected weight at step 1418, backroom client 570 closes the door(s) to the space(s) at step 1422.

At step 1424, backroom client 570 determines if restocking robot 752 is ready to move to sales floor 101. This determination can be made based on one or more of restocking robot 752's remaining capacity for additional items, the degree to which items in restocking robot 752 are needed on sales floor 101, the availability of employees on the sales floor to perform restocking and a restocking schedule. If restocking robot 752 is not ready to move to sales floor 101, the process of FIG. 14 returns to wait for either step 1400 or step 1402.

If restocking robot 752 is ready to move to sales floor 101, restock client 572 on the robot is initiated and causes the robot to travel to the nearest display unit requiring restocking at step 1426. To do this, restock client 572 determines the current location of the restocking robot within the store using store map 546 and GPS receiver 512 and compares that location to the location of each display unit of each item assigned to the restocking robot to identify the closest display unit. Restock client 752 then sends instructions to travel module 549 to move to the location of the closest display unit. Travel module 549 uses store map 546 to identify a path from its current location to the location of the closest display unit and uses GPS receiver 512, digital compass 510, cameras 270 and proximity sensors 272, to safely guide robot 752 along the path to the closest display unit.

Figure 15:
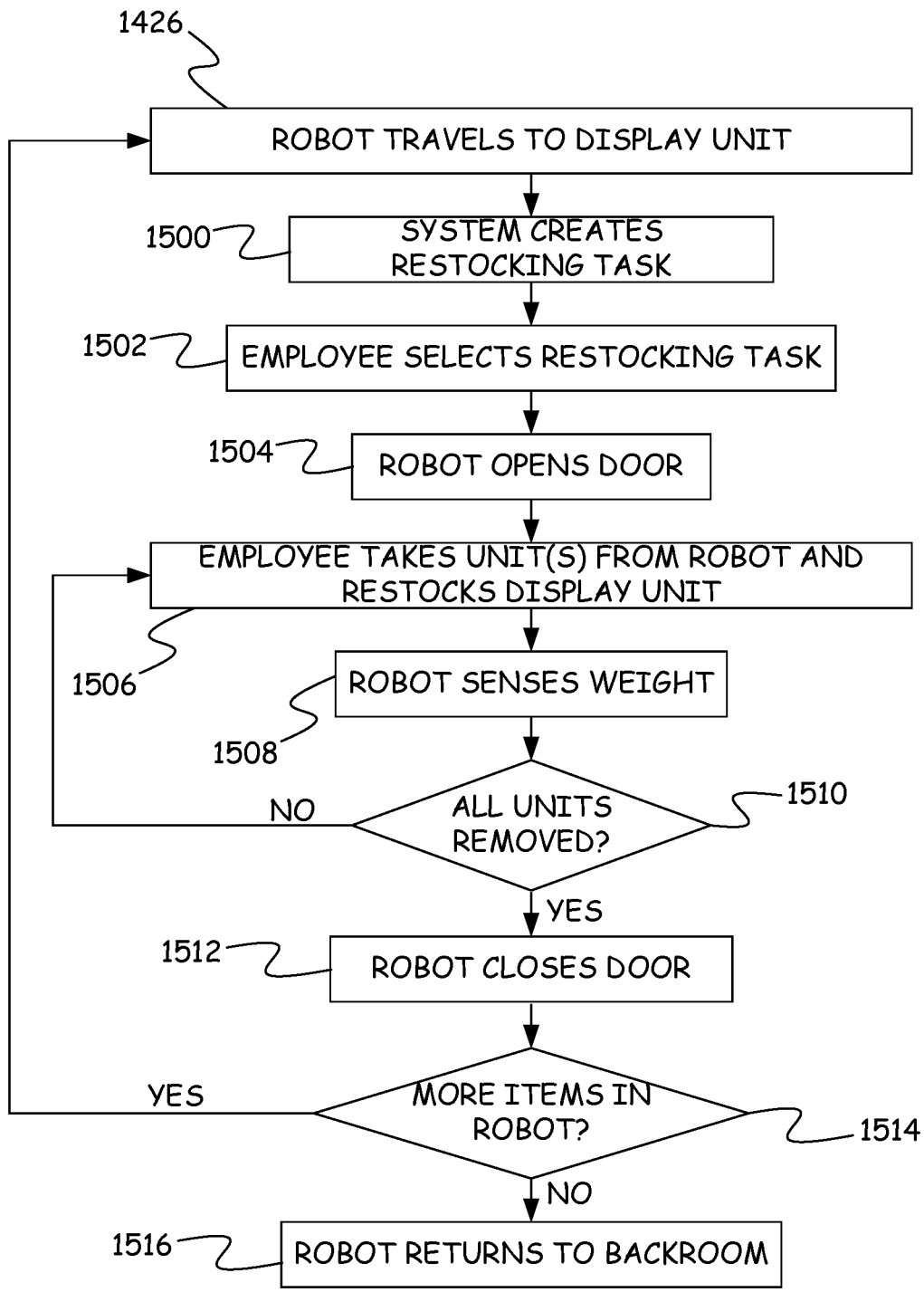
FIG. 15 is a flow diagram of a method of unloading a restocking robot to restock display units.

As shown in FIG. 15, as restocking robot 752 travels to the location of the display unit at step 1426, task formation module 710 creates a restocking task for each item in restocking robot 752 at step 1500. Each restocking task includes an item identifier and a location where the item is to be restocked.

At step 1502, a sales floor employee uses an employee device 720 to select an assigned restocking task. Selecting the restocking task causes a restock task client 756 to execute on employee device 720. At step 1504, restock client 572 opens the door(s) of the spaces containing the units of the item to be restocked. In accordance with the embodiments, restocking robot 752 opens only the doors to spaces that contain the particular item being restocked during the task. This helps prevent errors in which the incorrect item is stocked on the display unit. At step 1506, the employee takes the unit(s) from restocking robot 752 and places them on the display unit on sales floor 101.

At step 1508, restock client 572 receives a value from the load cell below the shelf of the item's space and uses the value to determine whether any units remain on the shelf. If a unit is still on the shelf, the process returns to step 1506 where the employee removes more units from the space. When the measured weight indicates that all of the units have been removed from restocking robot 752, restock client 572 closes the door(s) to the space(s) for the task at step 1512 and the task is considered to be completed.

At step 1514, restock client 572 determines if there are more items in restocking robot 752. If there are more items, restock client 572 returns to step 1426 and causes the robot to travel to nearest display unit requiring restocking. To do this, restock client 572 determines the current location of the restocking robot within the store using store map 546 and GPS receiver 512 and compares that location to the location of each display unit of each item assigned to the restocking robot to identify the closest display unit. Restock client 752 then sends instructions to travel module 549 to move to the location of the closest display unit. Travel module 549 uses store map 546 to identify a path from its current location to the location of the closest display unit and uses GPS receiver 512, digital compass 510, cameras 270 and proximity sensors 272, to safely guide robot 752 along the path to the closest display unit. weight of the units placed on the shelf. Steps 1500-1514 are then repeated for the next item to be restocked.

When there are no more items that need restocking in restocking robot 752, restock client 572 causes restocking robot 752 to return to backroom 103. To do this, restock client 572 calls module 549, which uses store map 546 to identify a path from restocking robot 752's current location to backroom 103 and uses GPS receiver 512, digital compass 510, cameras 270 and proximity sensors 272, to safely guide robot 752 along the path to backroom 103.

Figure 16:
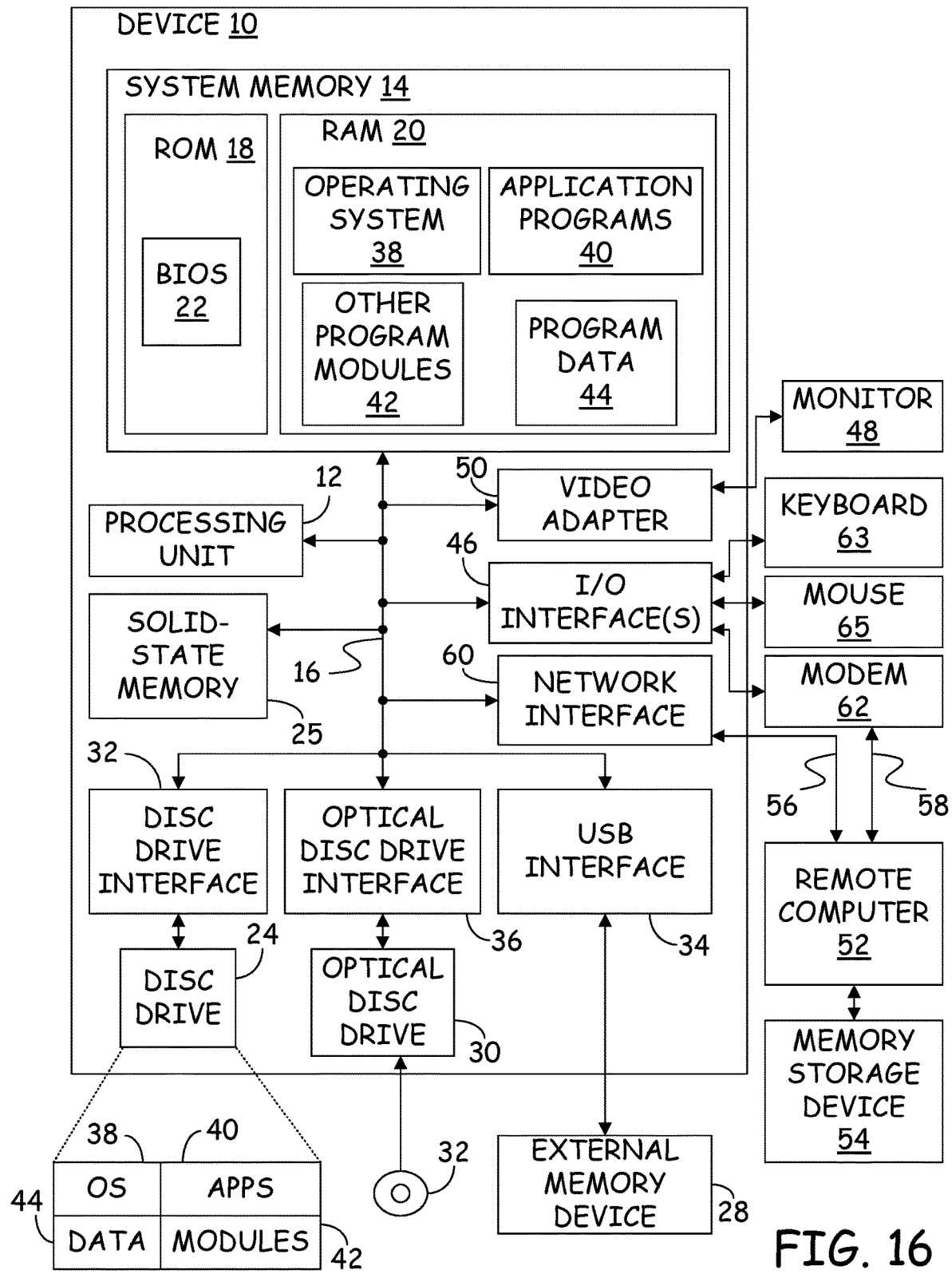
FIG. 16 is a block diagram of a computing environment used in accordance with the various embodiments.

FIG. 16 provides an example of a computing device 10 that can be used as a server or client device in in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 16. The network connections depicted in FIG. 16 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 16 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
receiving an indication that an order scheduled for later pickup is to be picked up earlier than scheduled;
identifying a plurality of robots that are holding items that form at least part of the order; and
instructing each of the plurality of robots to move immediately to a pickup location and to make the items of the order held by the plurality of robots available for retrieval from the plurality of robots.

2. The computer-implemented method of claim 1, wherein each robot comprises a plurality of compartments.

3. The computer-implemented method of claim 2, wherein when the plurality of robots reach the pickup location, each robot opens compartments only containing items for the order to be picked up earlier than scheduled.

4. The computer-implemented method of claim 3, wherein each of the plurality of robots holds items for at least one other order.

5. The computer-implemented method of claim 4, wherein when the items for the order have been removed from a robot, the robot returns to where it was positioned when it was instructed to move immediately to the pickup location.

6. The computer-implemented method of claim 4, wherein when the items for the order have been removed from a robot, a critical time for the robot to have items removed from the robot is updated.

7. The computer-implemented method of claim 1, further comprising identifying items in the order that have not been placed in any robot.

8. A method comprising:
instructing a plurality of picking robots containing items for a plurality of orders to provide access to items associated with one order of the plurality of orders;
instructing a rebin robot to provide access to a space in the rebin robot that will receive items of the one order;
moving items for the one order from the plurality of picking robots to the space in the rebin robot that receives items of the one order; and
receiving an indication that items for the one order have been moved from the plurality of picking robots to the area in the rebin robot.

9. The method of claim 8, further comprising:
upon receiving an indication that items for the one order have been moved to the space in the rebin robot:
instructing the plurality of picking robots to provide access to items associated with a second order of the plurality of orders;
instructing a rebin robot to provide access to a space in the rebin robot that will receive items of the second order;
moving items for the second order from the plurality of picking robots to the space in the rebin robot that receives items of the second order; and receiving an indication that items for the second order have been moved from the plurality of picking robots to the rebin robot.

10. The method of claim 9, further comprising:
instructing the rebin robot to move to a packing area;
instructing the rebin robot to provide access to the space containing the items for the one order of the plurality of orders;
removing the items for the one order from the rebin robot; and
receiving an indication that the items for the one order have been removed from the rebin robot.

11. The method of claim 10, wherein at any one time, the rebin robot provides access to spaces containing items of a single order when in the packing area.

12. The method of claim 8, further comprising, before instructing the plurality of picking robots to provide access to items associated with the one order:
determining that at least one order in the plurality of orders has reached a critical time for packing the at least one order;
instructing all picking robots that contain at least one item of the at least one order that has reached the critical time to move from a respective picking area to a rebin area; and
instructing the rebin robot to move to the rebin area.

13. The method of claim 11, further comprising:
receiving an indication an order is being picked up earlier than scheduled; and
instructing a plurality of picking robots containing items for the order that is being picked up earlier than scheduled to leave the rebin area and move to a packing area.

14. The method of claim 8, wherein each picking robot limits access to items such that at any one time, items for only a single order can be accessed.

15. The method of claim 14, wherein the rebin robot limits access to areas in the rebin robot such that at any one time, only areas for a single order can be accessed.

16. A robot comprising:
an access control that limits access to a space within the robot; and
a space adjustment module that can alter the volume of the space within the robot.

17. The robot of claim 16, wherein the space adjustment module adjusts the volume based on at least one item associated with an order that is to be placed in the space.

18. The robot of claim 16, wherein the volume adjustment module is configured to cause a vertically movable shelf to move.

19. The robot of claim 18, wherein the space adjustment module is further configured to cause a moveable shelf divider to move.

20. The robot of claim 16, wherein the access control comprises a door that provides access to only the space.

21. The robot of claim 16, wherein the robot is configured to move autonomously through an environment.

* * * * *